United States Patent [19]

Munday

[11] Patent Number: 5,196,104
[45] Date of Patent: Mar. 23, 1993

[54] OXYGEN AND HYDROGEN GAS DRIVEN TURBINE

[76] Inventor: John F. Munday, General Delivery, Shediac Bridge, New Brunswick, Canada, F0A-3H0

[21] Appl. No.: 854,079

[22] Filed: Mar. 19, 1992

[51] Int. Cl.⁵ .......................... C25B 1/10; C25B 9/00; C25B 15/08
[52] U.S. Cl. .................................. 204/258; 204/266; 204/270; 204/278; 123/3
[58] Field of Search ............... 204/129, 256, 258, 266, 204/270, 278, 255, 257, 263–265

[56] References Cited

U.S. PATENT DOCUMENTS

| | | | |
|---|---|---|---|
| 1,876,879 | 9/1932 | Drabold | 204/278 X |
| 3,980,053 | 9/1976 | Horvath | 204/129 X |
| 4,224,797 | 9/1980 | Kelly | 204/129 X |
| 4,344,831 | 8/1982 | Weber | 204/278 X |
| 4,361,474 | 11/1982 | Shoaf et al. | 204/278 X |
| 4,368,696 | 1/1983 | Reinhardt | 123/3 |
| 4,450,060 | 5/1984 | Gonzalez | 204/270 X |
| 4,841,731 | 6/1989 | Tindell | 204/129 X |

Primary Examiner—Donald R. Valentine
Attorney, Agent, or Firm—John B. Dickman, III

[57] ABSTRACT

A water to fuel production apparatus including a tank divided into compartments for producing hydrogen and oxygen through electrolysis, where the gases do not mix until they enter a gas turbine engine.

In another embodiment the hydrogen and oxygen gases mix in a venturi at the end of a turbine.

In both embodiments the turbine has an impeller end to draw both or one of the gases into the turbine.

11 Claims, 4 Drawing Sheets

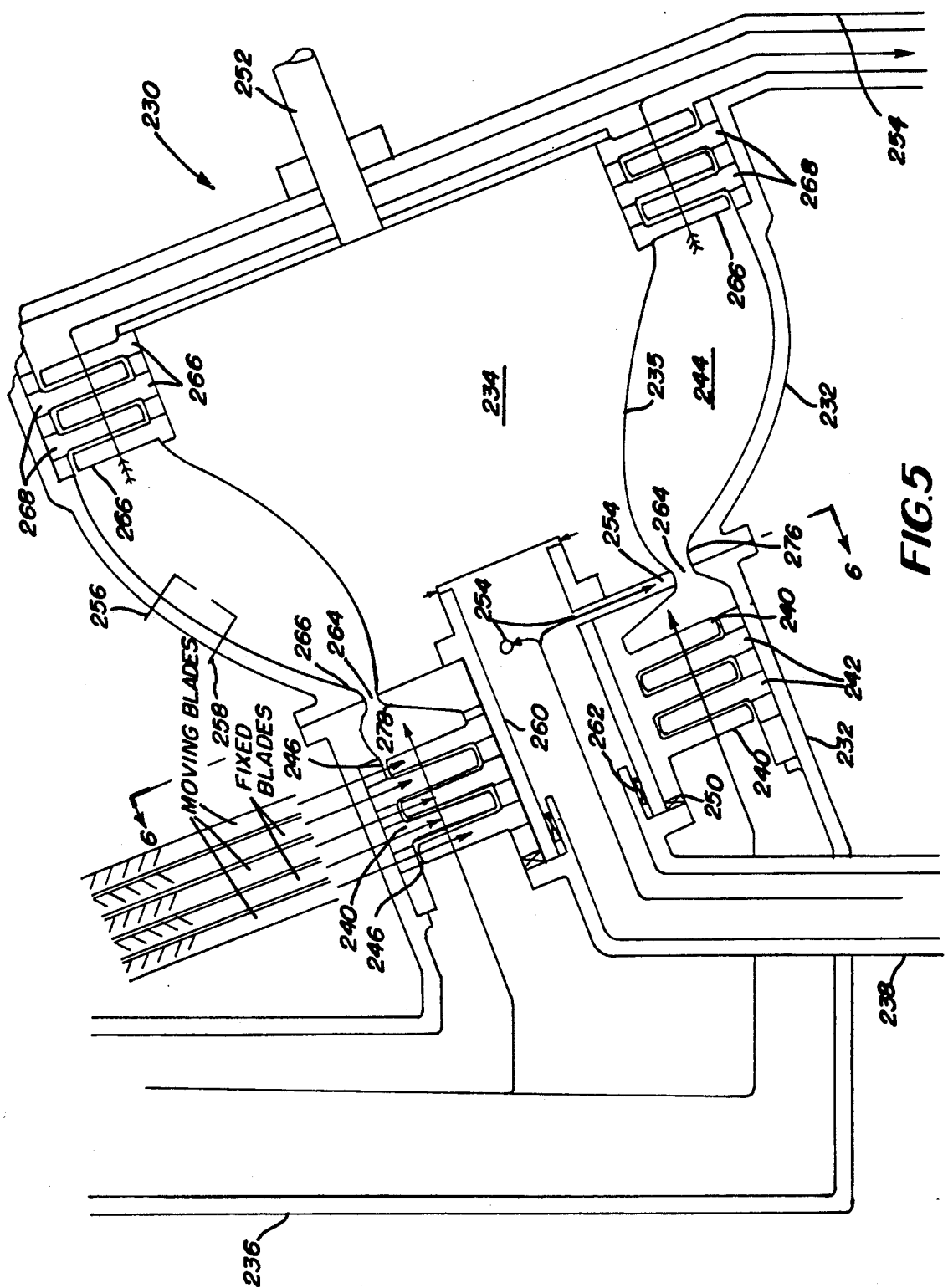

OXYGEN AND HYDROGEN GAS DRIVEN TURBINE

BACKGROUND OF THE INVENTION

The present invention relates to a gas driven turbine, and in particular an oxygen and hydrogen gas driven turbine.

Heretofore there have been attempts to develop a fuel for internal combustion engines to replace petroleum fuels. The concerns for burning petroleum fuels are well documented. Petroleum fuels are being used up and since there is a limited supply it is obvious that alternative sources of fuel must be developed. In addition, there are environmental reasons for a new fuel that does not pollute the atmosphere with carbon, nitrogen or sulfur based gases. The effects of atmospheric pollution from fossil fuels are a world wide concern. Animal and plant life are being destroyed by the effects of pollution. These effects range from respiratory problems in humans to the destruction of forest.

Prior art U.S. Patents show the electrolysis production of hydrogen and oxygen gases from the disassociation of water. The hydrogen and oxygen gases produced are intended to be used as fuel for internal combustion engines.

There is a flash back eliminator present in the present application. The following is a list of U.S. Patents of interest to the present invention:
U.S. Pat. No. 2,365,330, issued to Carmichael.
U.S. Pat. No. 2,496,623, issued to Fragale.
U.S. Pat. No. 4,023,545, issued to Mosher et al.
U.S. Pat. No. 4,344,831, issued to Weber.

The patent issued to Carmichael is the oldest known reference to the inventor that is directed to the use of hydrogen and oxygen gases as a source of fuel for automobiles. The gases commingle just prior to entering the automobile engine, which is a reciprocating internal combustion engine. Note, also the Fragale patent which shows a reciprocating engine and the production of hydrogen and oxygen gases as fuels.

The Mosher et al and the Weber patents are directed to the production of hydrogen and oxygen gases as fuels.

The cited references do not suggest the production and use of hydrogen and oxygen gases as fuels for turbine engines. The present invention is directed to a turbine engine that runs on hydrogen and oxygen gases.

SUMMARY OF THE INVENTION

The present invention provides an electrolysis apparatus for converting water to hydrogen and oxygen gases and using the gases to power a turbine.

A water fuel tank consists of two compartments, separated by a partition. The partition does not extend to the bottom of the tank, thus allowing the water to flow freely between the compartments. The areas above the water in each compartment form a gas collection chamber for either hydrogen or oxygen. There are electrodes extending into each compartment, submerged in the water. The electrodes that connect to a negative direct current source are cathodes for separating hydrogen from water. Electrodes connected to a positive direct current source are anodes for separating oxygen from water. Since hydrogen and oxygen gases are lighter that water they collect in their appropriate chamber above the water level.

A small amount of sulphuric acid is added to assist the electrolysis process. Provided the water is not drained or leaks out of the water fuel tank no additional acid will be added to the water.

The hydrogen gas is separated from the oxygen gas by the partition dividing the tank into two compartments and the water level. The only place the two gases meet is where turbine driven impellers commingle the gases prior to entering a gas turbine, or at a venturi prior to entering a gas turbine as in another embodiment.

The turbine has a plurality of vanes which rotate a rotor connected to output shafts. One of the shafts connects to impellers for commingling the gases and pumping them to the turbine chamber. The other of the output shafts connects to the input shaft of a vehicle. A continuous spark is produced in the turbine chamber. There are manifolds connecting the hydrogen and oxygen gas chambers to the turbine assembly. Butterfly valves act as throttle valves, opening and closing the manifolds to control the flow of the gases. Water vapor and steam produced during the ignition and subsequent conversion of hydrogen and oxygen gases are returned to the water tank.

In another embodiment only the hydrogen gas is pumped to the turbine by the impellers. There is a venturi through which the hydrogen gas passes. The oxygen gas is drawn through the center of the impeller housing by the venturi effect to mix with the hydrogen gas and passed on to a combustion chamber of the turbine.

There are flash back eliminators present in the different embodiments of the invention.

DESCRIPTION OF THE DRAWINGS

FIG. 5 is a sectional view of another embodiment.

DESCRIPTION OF THE INVENTION

Figure 1:
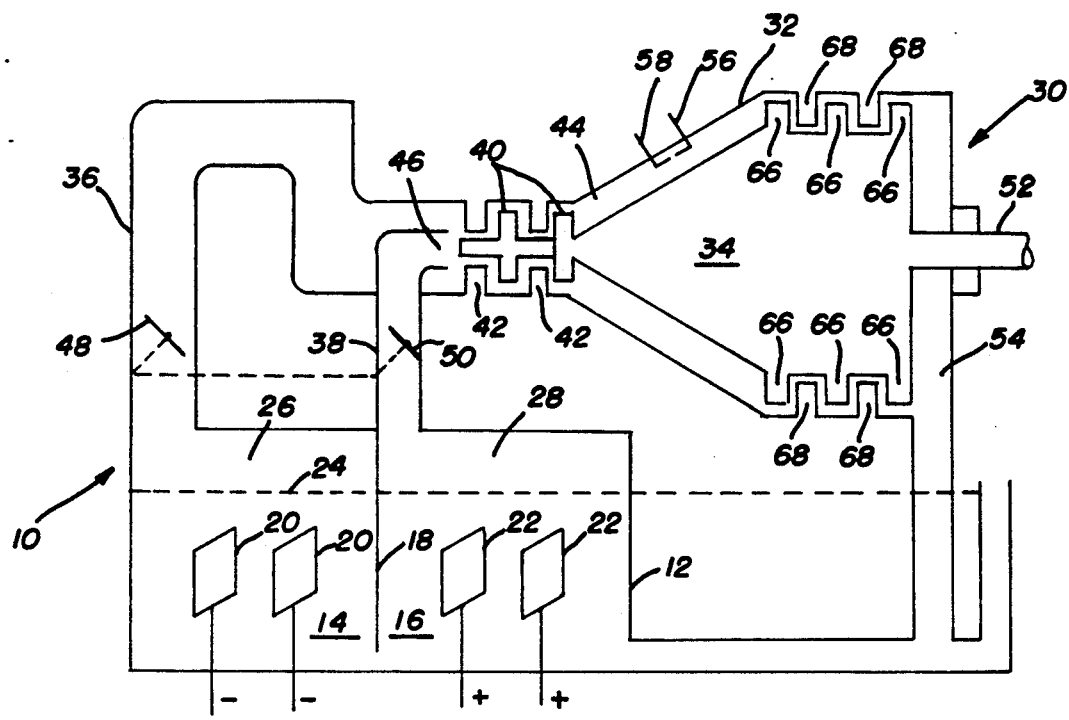
FIG. 1 is a schematic of the hydrogen and oxygen gases production apparatus and a gas turbine of the present invention.

Referring to the drawings FIGS. 1 to 6 there is shown an electrolysis apparatus and turbine combination 10. There is a water tank 12 divided into a pair of compartments 14 and 16 with a divider 18 separating the compartments. Each compartment has an equal number of electrodes. One set of electrodes are connected to a negative direct current source to become cathodes 20 for attracting hydrogen gas, and the other set of electrodes are connected to a positive direct current source to become anodes 22 for attracting oxygen gases. The tank 12 is filled with water to a level 24. Above the water level 24 is formed a pair of chambers 26 and 28 for holding hydrogen gas and oxygen gas, respectively.

A turbine 30 having a stationary combustion chamber housing 32 and a rotor 34 is connected to chambers 26 and 28 via manifolds 36 and 38, respectively. Integrally connected to the turbine 30 is an impeller 40 and an impeller housing and stationary blades 42.

Impeller 40 is connected to the tapered end of rotor 34 so that as the rotor turns the impeller also turns, drawing gases into a combustion chamber 44 defined by housing 32 and rotor 34. Oxygen manifold 38 has a diameter that is less than hydrogen manifold 36, thereby manifold 38 is mounted with an opening 46 at the end of impeller housing 42 and inside of manifold 36 which connects to impeller housing 42. To control the flow of gases each manifold 36 and 38 has a butterfly valve 48 and 50, respectively. The butterfly valves 48 and 50 are connected together to operate together.

Turbine 30 has an output shaft 52 which connects to a vehicle drive train. There is also an exhaust end 54 through which water vapor and steam pass returning to water tank 12. Also there are ignition spark leads 56 and 58 for igniting the hydrogen and oxygen gases.

In operation, water tank 12 is filled with water to level 24. Direct current is passed through cathodes 20 and anodes 22 separating hydrogen gases and oxygen gases from the water by electrolysis. The separated gases travel through their respective manifolds 36 and 38 to turbine 30 where they mix. Impellers 40 pump the mixed gases into combustion chamber 44 where they are ignited. The force of combusted gases rotate rotors 66, thereby rotating output shaft 52.

Figure 2:
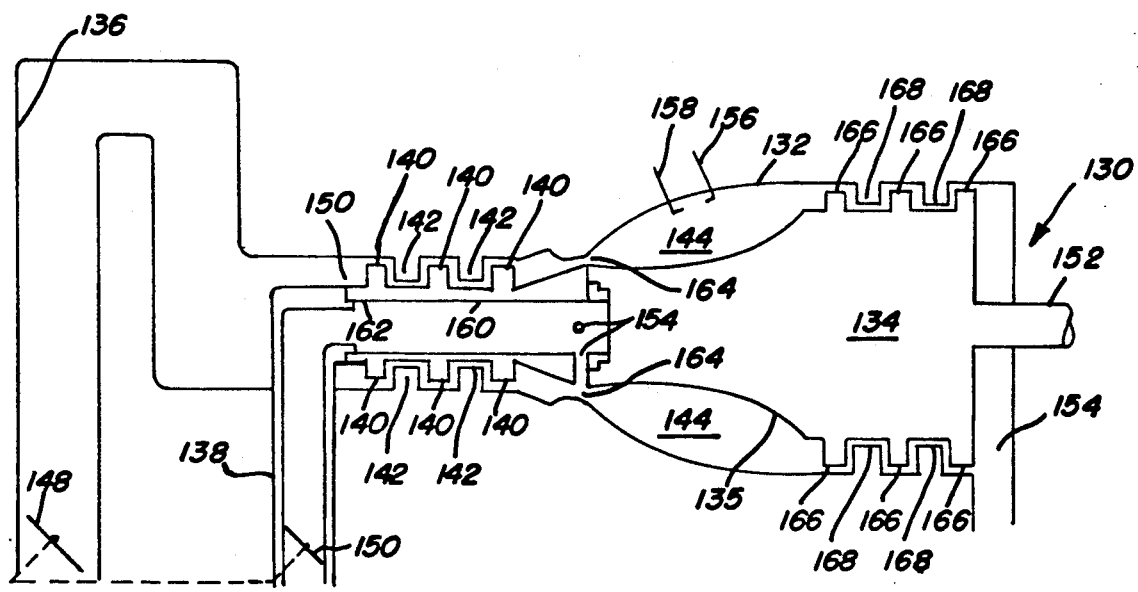
FIG. 2 is a schematic of another embodiment of the invention.

In FIG. 2, another embodiment of a turbine is shown. Turbine 130 has a combustion chamber housing 132 and a rotor 134. Between the housing 132 and rotor 134 is a combustion chamber 144. A pair of spark electrodes 156 and 158 extend into combustion chamber 144. Rotor 134 has an arcuate concave cross section area 135 to increase the volumn of combustion, Connected to one end of rotor 134 in a hollow shaft 160 which rotates on bearings attached to the oxygen manifold at 162. Surrounding impellers 140 is an impeller housing 142 which connects to hydrogen gas manifold 136. Oxygen gas manifold 130 cerries the bearing and thrust bearing for the end of the hollow shaft 162 to locate and permit the oxygen gas to pass the said hollow shaft through the passage ways 154 out of the venturi at 164.

The end of the rotor 134 connected to the hollow shaft 160 rotates at 162 on oxygen housing 138 cooperates with a venturi opening 164 and the hydrogen gas pump through the venturi opening by impellers 140 to draw oxygen gas into the combustion chamber where it mixes with hydrogen gas just prior to ignition. The combusted gases rotate the rotor 134 by passing between the housing 132 and rotor impellers 166. Steam and water vapor are exhausted through exhaust opening 154 to a water tank of an electrolysis system, not shown.

Figure 3:
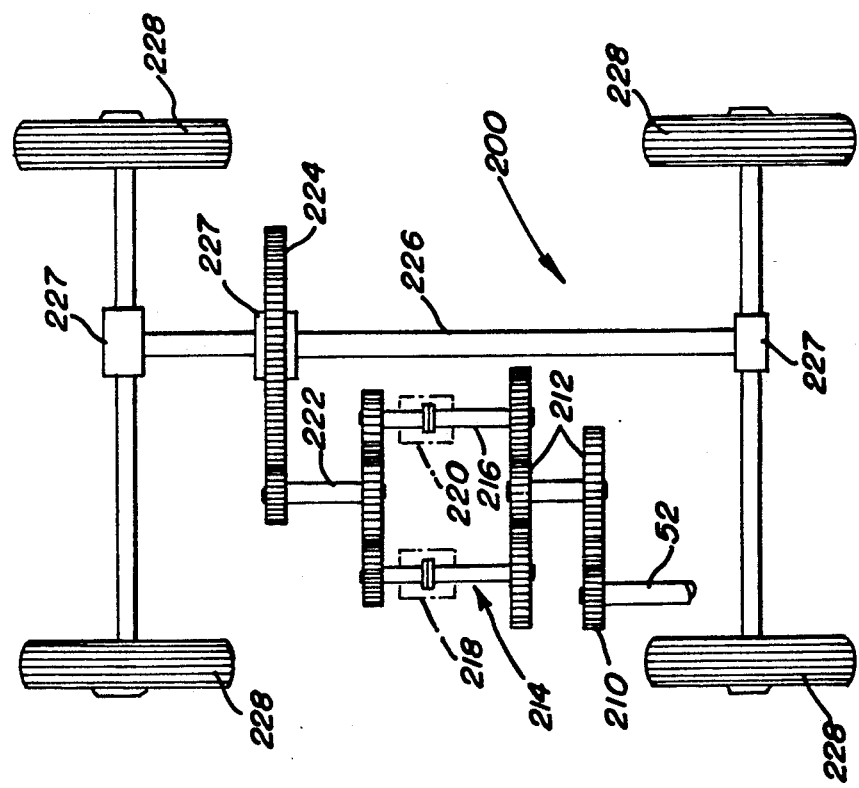
FIG. 3 is a plan view of a drive train of the present invention.

Turning to FIG. 3, there is shown a drive train 200 of an automobile. There is a drive shaft 52 which connects to output shaft 52 of turbine 30. Shaft 52 has a gear 210 that drives gear system 212. A pair of magnetically clutched gear systems 214 and 216 are selectively engaged by gear system 212. Magnetic clutches 218 and 220 move the gear systems 214 or 216 into engagement. An output gear system 222 will rotate clockwise or counter-clockwise according to which gear system 214 or 216 is engaged. A driven gear 224 or driven shaft 226 turns wheels 228. Differential gears 227 are used to give stability to the All Wheel Drive assembly. This is a typical gear system which can be used with the present hydrogen gas and oxygen gas fuel operated turbine.

Figure 4:
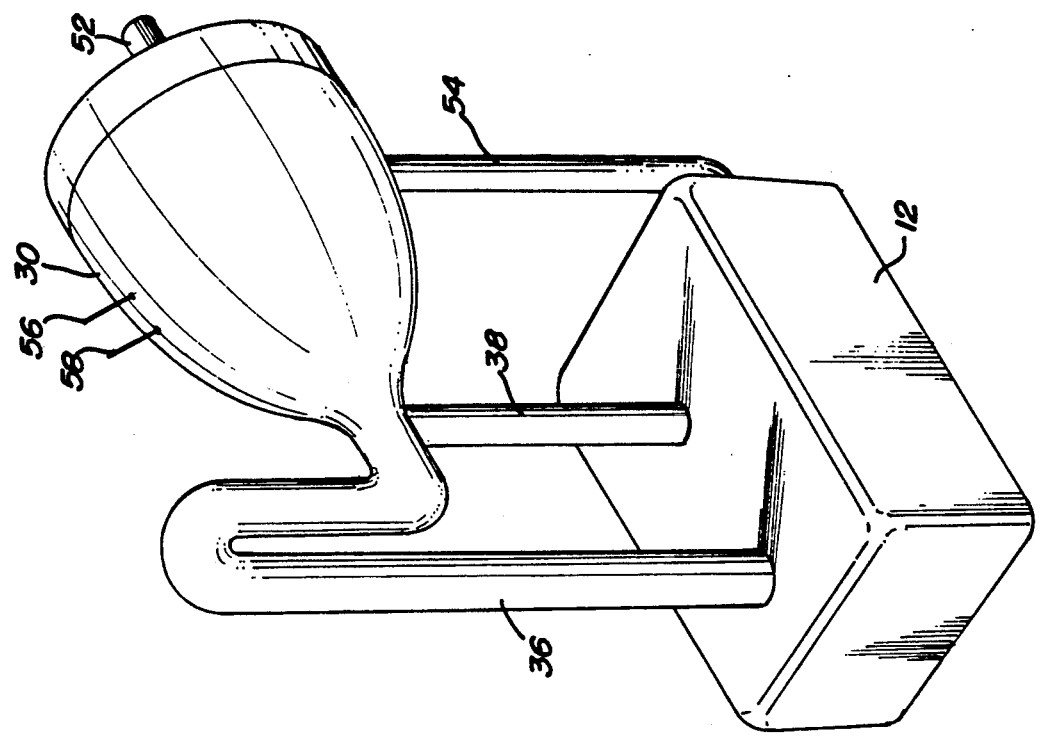
FIG. 4 is a perspective of a water tank and turbine of the present invention.

FIG. 4 is a showing of a turbine 30 connected by manifolds 36 and 38 to electrolysis apparatus tank 12. The hydrogen manifold 36 has an inverted U-bend to prevent flash back of hydrogen gases in case of explosion.

FIG. 5 is the same drawing as FIG. 2 with the exception that FIG. 5 shows greater detail.

The embodiment of FIG. 5 shows a turbine 230 which connects to an electrolysis 10 by hydrogen manifold 236 and oxygen manifold 238. The hydrogen manifold 236 connects to turbine housing 240 which contains stator turbine blades 242. Oxygen manifold 238 extends through turbine housing 232 and connects a hollow shaft 260 of a turbine rotor 234. Hollow shaft 260 supports rotating turbine blades 240. Between the end of oxygen manifold 238 and the inside of hollow shaft 260 is a bronze bearing 262 to reduce any friction of the hollow rotating shaft 260. There is also a thrust bearing 250 between hollow shaft 260 and a flange 250 on manifold 238. Three holes 254 (two shown) spaced 120 degrees apart around the hollow shaft 244 (best shown in FIG. 6) provide passages for the oxygen gas to pass through venturi ports 264 to commingle with the hydrogen gas at the throat of a venturi 264. The venturi is defined by a lobe 276 on housing 232 and a second lobe 278 on rotor 234.

Turbine rotor 234 has an arcuate concave cross section area 235 to increase the volume of combustion chamber 244, similar to rotor 134 in FIG. 2. The combustion chamber 244 is defined by turbine housing 232 and rotor 234, which provides a circular chamber for burning hydrogen and oxygen gases. The force of the ignition of the gases create a force on turbine impellers 266 and 268. Impeller 266 are mounted on rotor 234, while stationary impellers 268 are mounted on the inside of housing 232. Exhaust gases leaving the impellers are converting or have converted to steam and water vapor to return to the electrolysis apparatus 10 through exhaust manifold 254.

Figure 6:
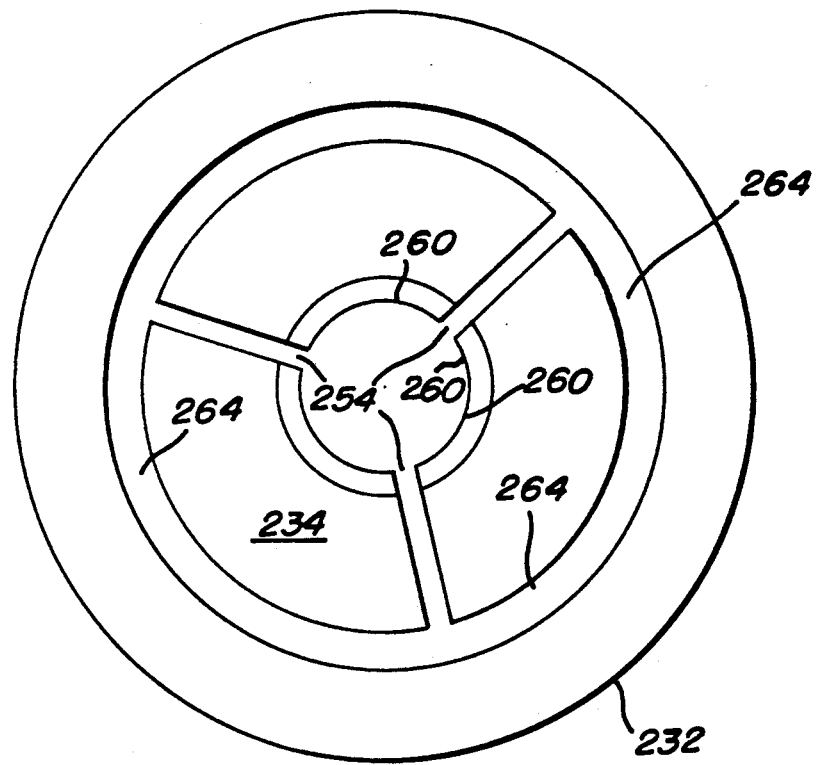
FIG. 6 is a sectional view on line 6—6 of FIG. 5.

FIG. 6 shows hollow shaft 260 and the ports 254 for passage of oxygen gas. Ports 254 are aligned with venturi passages 264 in rotor 234. Also shown is housing 232 and venturi throat 264.

It will, of course, be understood that various changes may be made in the form, details, arrangement and proportions of the various parts without departing from the scope of the invention.

I claim:

1. A water to fuel production apparatus for providing fuel for a gas turbine engine, comprising:
   a fuel production tank having a first compartment and a second compartment, where a divider seals each compartment from the other at the top of the tank, and connect said compartments along the bottom of the tank;
   said first compartment having cathodes for the production of hydrogen, and connected to a hydrogen manifold for removing hydrogen gas from the compartment;
   said second compartment having anodes for production of oxygen, and connected to an oxygen manifold for removing oxygen gas from the compartment;
   said oxygen manifold having a diameter of a size to fit within said hydrogen manifold whereby said gases will mix together where the open ends of said manifold meet;
   said hydrogen manifold being connected to a turbine having an intake end with impellers for pumping said mixed gases into said turbine, where they subsequently ignite.

2. A water to fuel production apparatus as in claim 1 wherein said turbine has a ststionary housing, a rotor provided with an output shaft and an input shaft connected to said impellers.

3. A water to fuel production apparatus as in claim 2 wherein said cathodes and anodes being supported in tank having electrical leads connected to a source of d.c. current to produce hydrogen and oxygen by electrolysis.

4. A water to fuel production apparatus as in claim 3 wherein said hydrogen manifold has an inverted U-bend to trap lighter hydrogen gases above the atmospheric gases to safely burn any premature ignition.

5. A water to fuel production apparatus as in claim 4 wherein said turbine has a water vapor and steam return to said water tank.

6. A water to fuel production apparatus for providing fuel for a gas turbine engine, comprising:
- a fuel production tank having a first compartment and a second compartment, where a divider seals each compartment from the other at the top of the tank, and connect said compartments along the bottom of the tank;
- said first compartment having cathodes for the production of hydrogen, and connected to a hydrogen manifold for removing hydrogen gas from the compartment;
- said second compartment having anodes for production of oxygen, and connected to an oxygen manifold for removing oxygen gas from the compartment;
- said oxygen manifold having a diameter of a size to fit within said hydrogen manifold whereby said gases will mix together where the open ends of said manifold meet;
- said hydrogen manifold being connected to a turbine having an intake end with impellers for pumping said hydrogen through a venturi in said turbine, said oxygen manifold being connected to said venturi whereby said hydrogen gas flow draws said oxygen gas into said turbine where said gases mix and are subsequently ignited.

7. A combination water to fuel electrolysis apparatus and a gas driven turbine comprising;
- an electrolysis apparatus for converting water to hydrogen gas and oxygen gas, where said apparatus includes a fuel production tank having a first compartment and a second compartment separated by a divider which seals one compartment from the other at the top of said tank, and where said compartments connect along the bottom of said tank;
- said first compartment having cathodes for the production of hydrogen, and connected to a hydrogen manifold for removing hydrogen gas from said compartment;
- said second compartment having anodes for the production of oxygen and connected to an oxygen manifold for removing oxygen gas from said compartment;
- said cathodes and said anodes being connected to a source of electricity;
- a turbine means having a housing, a power shaft end and an intake end for receiving hydrogen and oxygen gases, and a rotor means within said housing;
- said rotor having a first end with a power shaft means and a second end with a hollow rotary shaft;
- a plurality of first rotary impeller means on said hollow rotary shaft, and a plurality of first stationary impeller means on said housing, where said plurality of first rotary impeller means alternate between said plurality of first stationary impeller means;
- a plurality of rotary drive impeller means on said rotor at said first end and a plurality of stationary drive impeller means on said housing at said power shaft end, where said plurality of rotary drive impellers on said rotor alternate between said plurality of stationary impeller means;
- a combustion chamber between said rotor and said turbine housing having ignition means connected to said source of electricity;
- said hollow rotary shaft having a plurality of bores which connect to a plurality of venturi apertures in said rotor, and a venturi means between said rotor and said housing where said venturi apertures extend to said venturi means;
- said turbine intake end being connected to said hydrogen manifold, where said hydrogen gas from said electrolysis apparatus is drawn into said turbine by said rotary first impeller means and said first second impeller means;
- said turbine hollow rotary shaft being connected to said oxygen manifold, where oxygen gas from said electrolysis apparatus is drawn into said turbine by said venturi means, and the hydrogen gases commingle with said oxygen gases at said venturi means.

8. A combination water to fuel electrolysis apparatus and gas driven turbine as in claim 7 wherein said turbine has an exhaust manifold at said power shaft end to return steam and water vapor produced by the ignition of hydrogen and oxygen gases in said combustion chamber.

9. A combination water to fuel electrolysis apparatus and gas driven turbine as in claim 8 wherein said combustion chamber is positioned between said plurality of first impeller means and said plurality of drive impeller means and said housing on said rotor, said rotor having a concave surface to increase the volume of said combustion chamber.

10. A combination water to fuel electrolysis apparatus and gas turbine as in claim 9 wherein said plurality of bores and said plurality of venturi apertures includes at least three equally spaced bores in said hollow rotary shaft and at least three equally spaced venturi apertures in said rotor where said bores and said apertures are aligned.

11. A combination water to fuel electrolysis apparatus and gas turbine as in claim 10 wherein said venturi means includes a first lobe means on the housing and a second lobe means on said rotor to provide a restricted venturi opening, and said venturi apertures extend to said restricted venturi opening.

* * * * *